United States Patent [19]

DiFonzo

[11] Patent Number: 4,501,042
[45] Date of Patent: Feb. 26, 1985

[54] FRONT-OF-DOCK DOCKBOARD

[75] Inventor: Mark A. DiFonzo, Brookfield, Wis.

[73] Assignee: Kelley Company, Milwaukee, Wis.

[21] Appl. No.: 310,499

[22] Filed: Oct. 13, 1981

Related U.S. Application Data

[63] Continuation-in-part of Ser. No. 110,124, Jan. 7, 1980, abandoned.

[51] Int. Cl.³ .............................................. B65G 69/28
[52] U.S. Cl. ..................................................... 14/71.3
[58] Field of Search .................. 14/71.3, 71.1, 71.7; 403/379; 248/613; 187/94

[56] References Cited

U.S. PATENT DOCUMENTS

| 993,510 | 5/1911 | Cowles | 248/613 |
|---|---|---|---|
| 1,255,356 | 2/1918 | Trust | 403/379 X |
| 2,473,126 | 6/1949 | Alexander | 14/71.1 |
| 2,644,180 | 7/1953 | Eycleshimer | 14/72 |
| 3,316,575 | 5/1967 | Larsen et al. | 14/71.3 |
| 3,426,377 | 2/1969 | Beckwith et al. | 14/71 |
| 3,596,303 | 8/1971 | Kelley | 14/71 |
| 3,685,077 | 8/1972 | Wiener et al. | 14/71 |
| 3,806,976 | 4/1974 | Yoon | 14/71 |
| 3,840,930 | 10/1974 | Wanddell | 14/71.3 |
| 4,091,488 | 5/1978 | Artzberger | 14/71.7 |
| 4,137,587 | 2/1979 | Rosengren | 14/71.3 |

FOREIGN PATENT DOCUMENTS

| 2632345 | 1/1978 | Fed. Rep. of Germany | 14/71.3 |
|---|---|---|---|
| 6514130 | 5/1966 | Netherlands | 187/94 |
| 1162943 | 9/1969 | United Kingdom | 187/94 |

OTHER PUBLICATIONS

"Owner's Manual Models 1555 & 1555-7"; Kelly Co., Inc.; pp. 7, 13, 16 and 17.

Primary Examiner—Rodney H. Bonck
Attorney, Agent, or Firm—Andrus, Sceales, Starke & Sawall

[57] ABSTRACT

A dockboard to be attached to the front of a loading dock. The dockboard includes a deck plate, the side edges of which are pivotally connected to guide bars that are movable vertically within guideways formed in the upper portion of a rectangular frame. The frame is mounted for vertical movement within guides mounted on the front face of the loading dock, and the frame and deck plate are partially counterbalanced to an upper position by a counterweight mechanism that is connected to the frame through a synchronized chain drive. The deck plate is stored in a vertical position below deck level and, in use, is lifted to a raised position above dock level, pivoted to a substantially horizontal position and then lowered into engagement with the bed of a carrier located in front of the dock. The pivotal connection between the deck plate and the guide bars enables the deck plate to tilt diagonally as a load moves across the deck plate in the event that the bed of the carrier is not parallel to the upper surface of the dock. When the carrier moves from the dock, the deck plate will swing to a vertical position and the frame will lower by gravity to move the deck plate to the vertical storage position.

12 Claims, 14 Drawing Figures

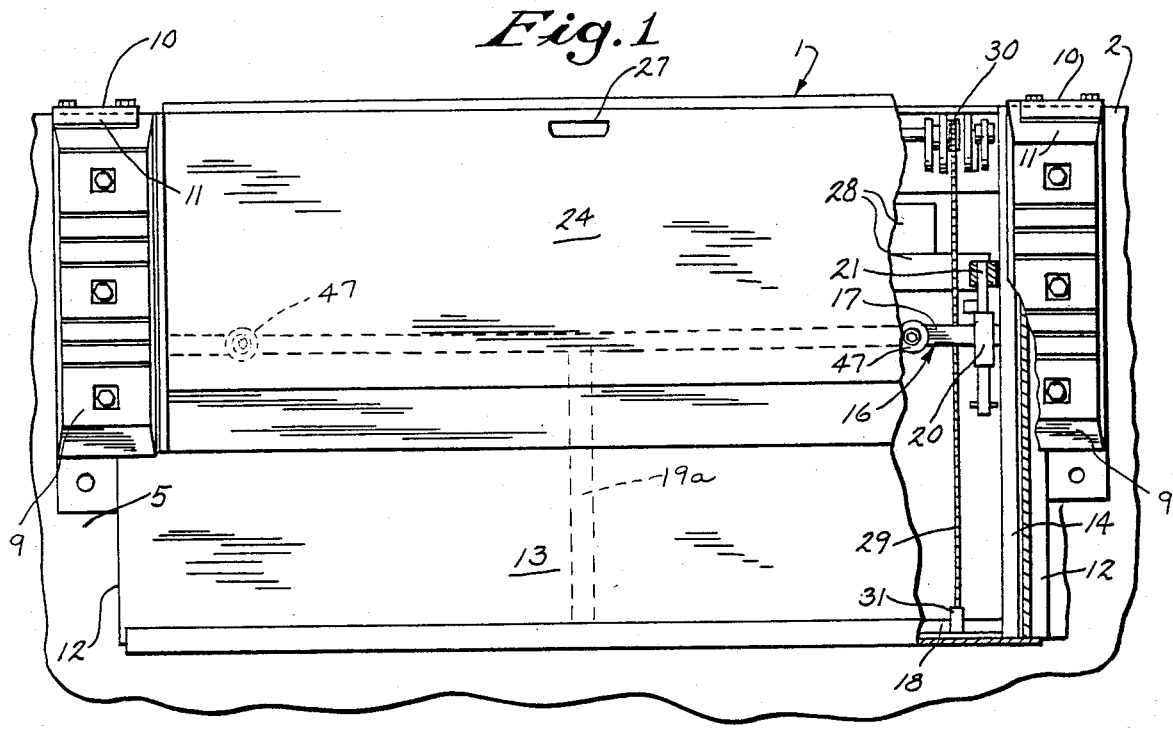
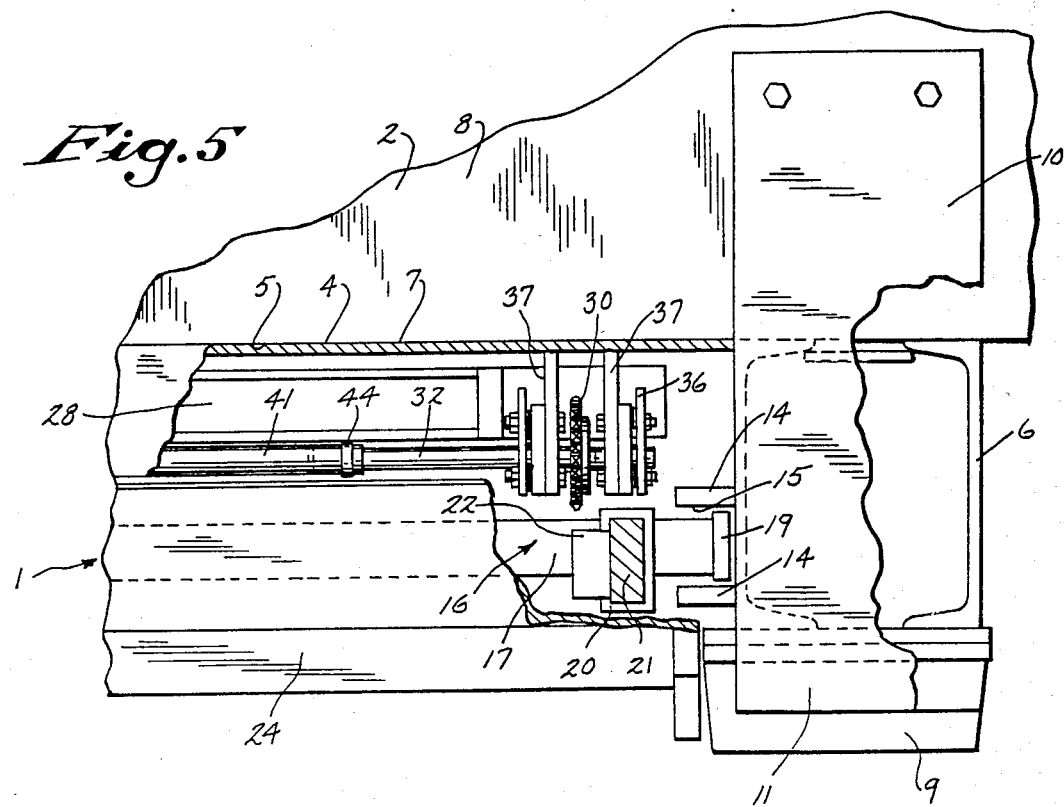

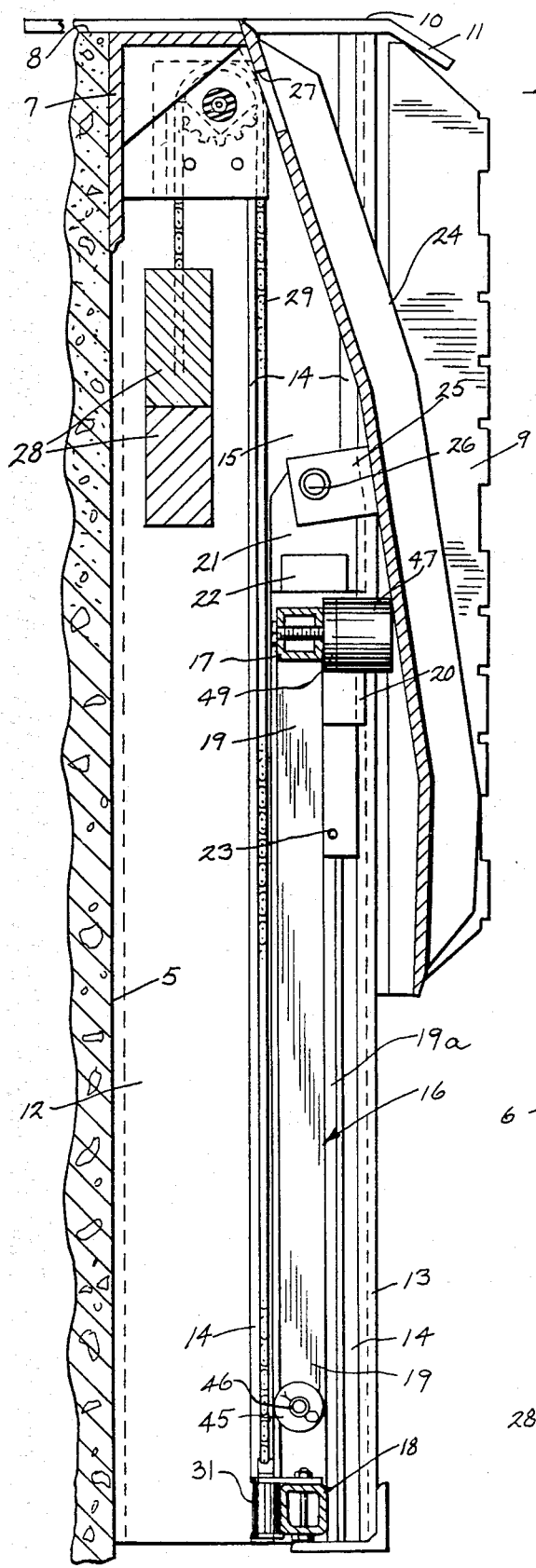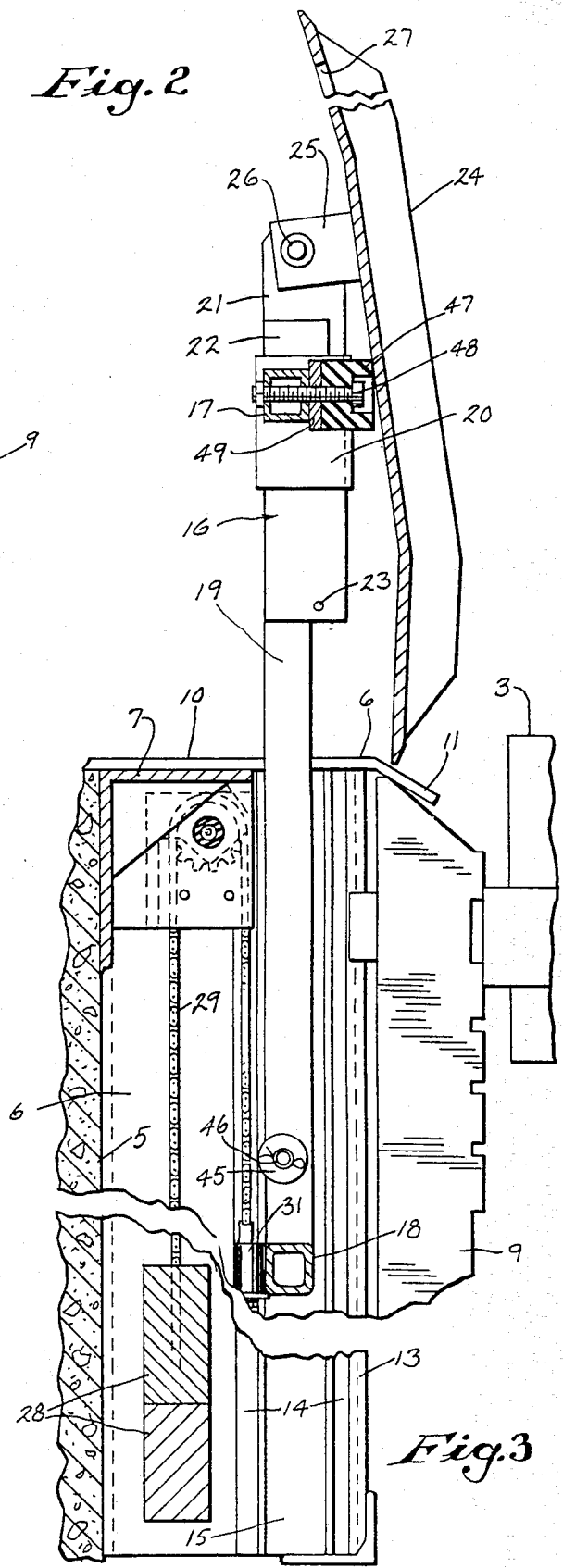

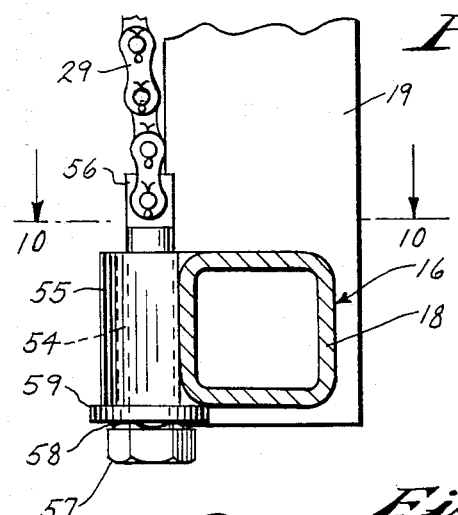
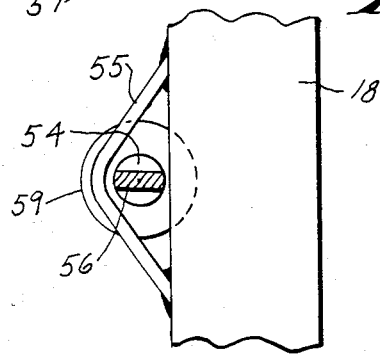
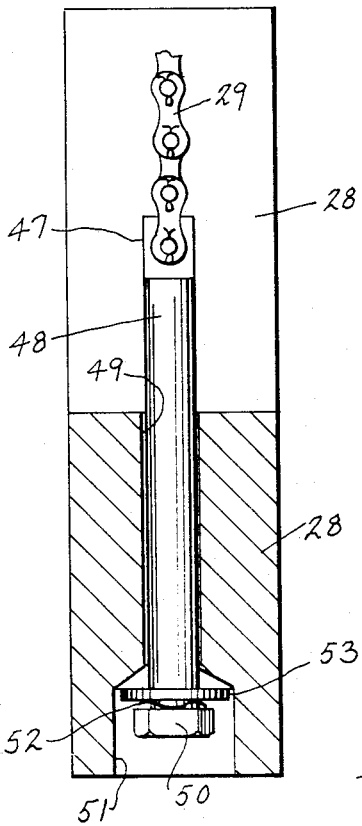
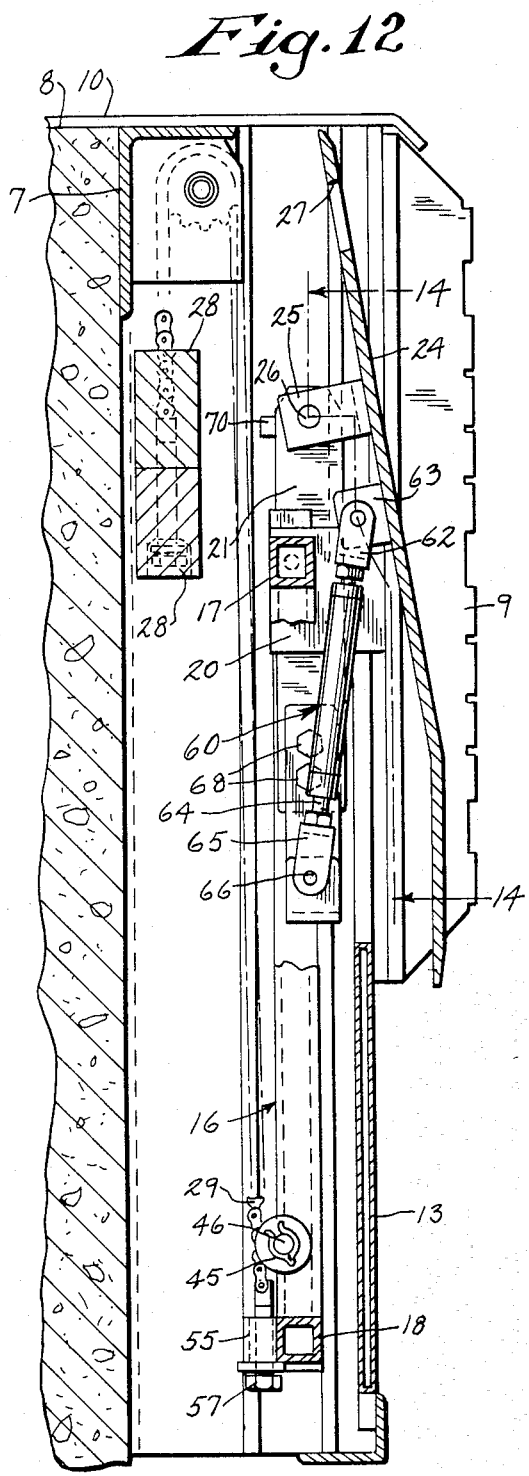

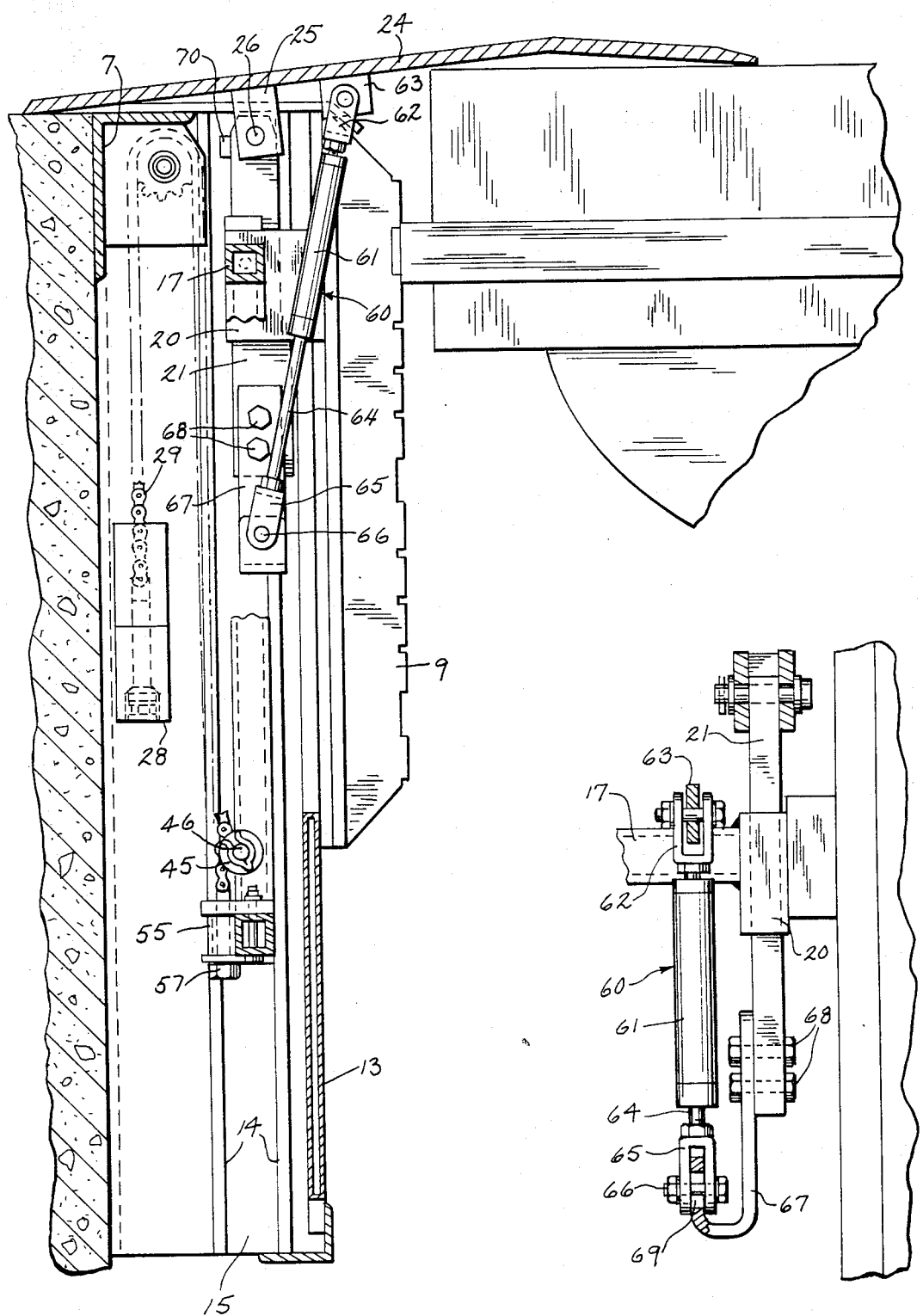

FRONT-OF-DOCK DOCKBOARD

BACKGROUND OF THE INVENTION

This application is a continuation-in-part of application Ser. No. 06/110,124, filed Jan. 7, 1980.

U.S. Pat. No. 3,596,303 directed to a dockboard to be mounted on the front of a loading dock. As described in that patent, a deck plate or ramp is normally stored in a vertical position in front of the loading dock and the side edges of the deck plate are pivotally connected to guide bars which are mounted for movement within guideways on the front surface of the dock.

When a truck or carrier pulls into position in front of the loading dock, the deck plate or ramp is manually lifted upwardly to an above-dock-level position, is pivoted about the guide bars to a substantially horizontal position and then is lowered downwardly until it engages the dock and the bed of a carrier.

As shown in the aforementioned patent, to aid in manually lifting the deck plate to the upper vertical position, a counterweight system is employed in which a series of weights are connected to the lower ends of the guide bars through a cable-pulley arrangement.

As the deck plate or ramp in the above-described dockboard is relatively short in a front-to-rear dimension, and as the ramp is normally provided with a hump or ridge which extends from side-to-side, the deck plate is relatively rigid and inflexible.

In most loading operations, the bed of the truck will not be parallel with the upper surface of the loading dock, but instead will normally be slightly tilted relative to the dock due to an uneven distribution of the load in the truck or the slope of the drive, etc. Thus, the entire forward edge of the ramp, in most cases, will not be seated on the truck bed. When a lift truck passes over the deck plate in travelling between the dock and the truck bed, the deck plate, due to its relatively stiff and inflexible nature, will not bend or deflect under the weight of the lift truck passing thereon, with the result that the deckplate can be subjected to severe stress.

SUMMARY OF THE INVENTION

The invention is directed to an improved front-of-dock dockboard which has a smooth and reliable operating action and includes a mechanism to enable the deck plate or ramp to tilt to compensate for non-alignment between the truck bed and the upper surface of the dock. More specifically, the dockboard of the invention includes a deck plate or ramp having its side edges pivotally connected to guidebars which are slidable within guideways formed in the upper edge portion of a generally rectangular frame. The frame, in turn, is mounted for vertical movement within guides mounted on the front surface of the dock.

To aid in manually lifting the deck plate from the lower vertical storage position to an upper position, a counterbalancing system is utilized in which a series of counterweights are connected to the frame through a synchronized sprocket and chain drive.

The deck plate is normally stored in the vertical position below dock level and after a truck or carrier pulls into position in front of the dock, the deck plate is manually lifted to a raised position above dock level, then pivoted to a substantially horizontal position and lowered by gravity into engagement with the bed of the truck and the loading dock. When the truck moves away from the dock after the loading operation is completed, the deck plate will swing to a generally vertical position and the frame will lower by gravity to move the deck plate to the lower storage position.

As the deckplate is pivoted to the guide bars which are mounted for sliding vertical movement with respect to the rectangular frame, the deck plate can tilt in a diagonal direction, as a lift truck passes over the deck plate, to compensate for misalignment between the truck bed and the upper surface of the dock. Because the deck plate is capable of tilting, the forward edge of the deck plate, if not in continuous contact with the truck bed, will be moved into continuous contact with the truck bed, as the weight of the lift truck is applied to the forward edge. This substantially reduces the stress to which the deck plate, and its supporting structure, is subjected during service.

The synchronized chain and sprocket drive, which connects the counterbalancing weights with the rectangular frame, prevents the frame from cocking or racking as it is moved vertically within the guides, thereby providing smoother vertical movement and enabling the deck plate to be more easily lifted to the upper position.

The ends of the chains are connected, respectively, to the frame and to the counterweight by an impact cushioning mechanism which cushions shock loads in the chain. When the deckplate returns by gravity to its storage position after the loading operation is completed, the counterweight rises and when the deckplate bottoms out, the inertia will cause the counterwieght to bounce, thereby subjecting the chains to a considerable impact load. Similarly, during normal use of the dockboard, the movement of a fork lift truck across the deckplate will tend to cause the deckplate and counterweight to bounce, also subjecting the chains to considerable stress. To cushion the shock loads on the chains, disc-like Bellville springs are incorporated in the connections of the chains to both the counterweight and the slidable frame which carries the deck plate.

In a modified form of the invention, the pivotal connection between the deckplate and the frame is moved toward the rear edge of the deckplate to provide a greater forward overhang for the deckplate when it is in the cross traffic position. In this situation, a counterbalancing mechanism in the form of a gas spring is interconnected between the deckplate and the guide bars that are mounted for sliding movement within the guideways in the frame. The gas spring applies a relatively uniform, high spring force to aid in pivoting the deckplate from the vertical storage position to the generally horizontal cross traffic position.

Other objects and advantages will appear in the course of the following description.

DESCRIPTION OF THE DRAWINGS

The drawings illustrate the best mode presently contemplated of carrying out the invention.

In the drawings:

FIG. 1 is a front elevation of the dockboard of the invention as mounted on a loading dock with parts broken away in section;

FIG. 2 is a vertical section of the dockboard as mounted on the loading dock and showing the deckplate in the lower storage position;

FIG. 3 is a view similar to FIG. 2, showing the deckplate in the upper raised position;

FIG. 5 is an enlarged fragmentary top view of the dockboard with parts broken away;

FIG. 9 is an enlarged vertical section showing the attachment of the chain to the frame;

FIG. 10 is a section taken along line 10—10 of FIG. 9;

FIG. 11 is an enlarged vertical section showing the connection of the chain to the counterweight;

FIG. 12 is a side elevation of a modified form of the dockboard with parts broken away, and showing the deckplate in the storage position;

FIG. 13 is a view similar to FIG. 12 showing the deckplate in the horizontal cross traffic position; and FIG. 14 is a section taken along line 14—14 of FIG. 12.

DESCRIPTION OF THE ILLUSTRATED EMBODIMENT

Figure 4:
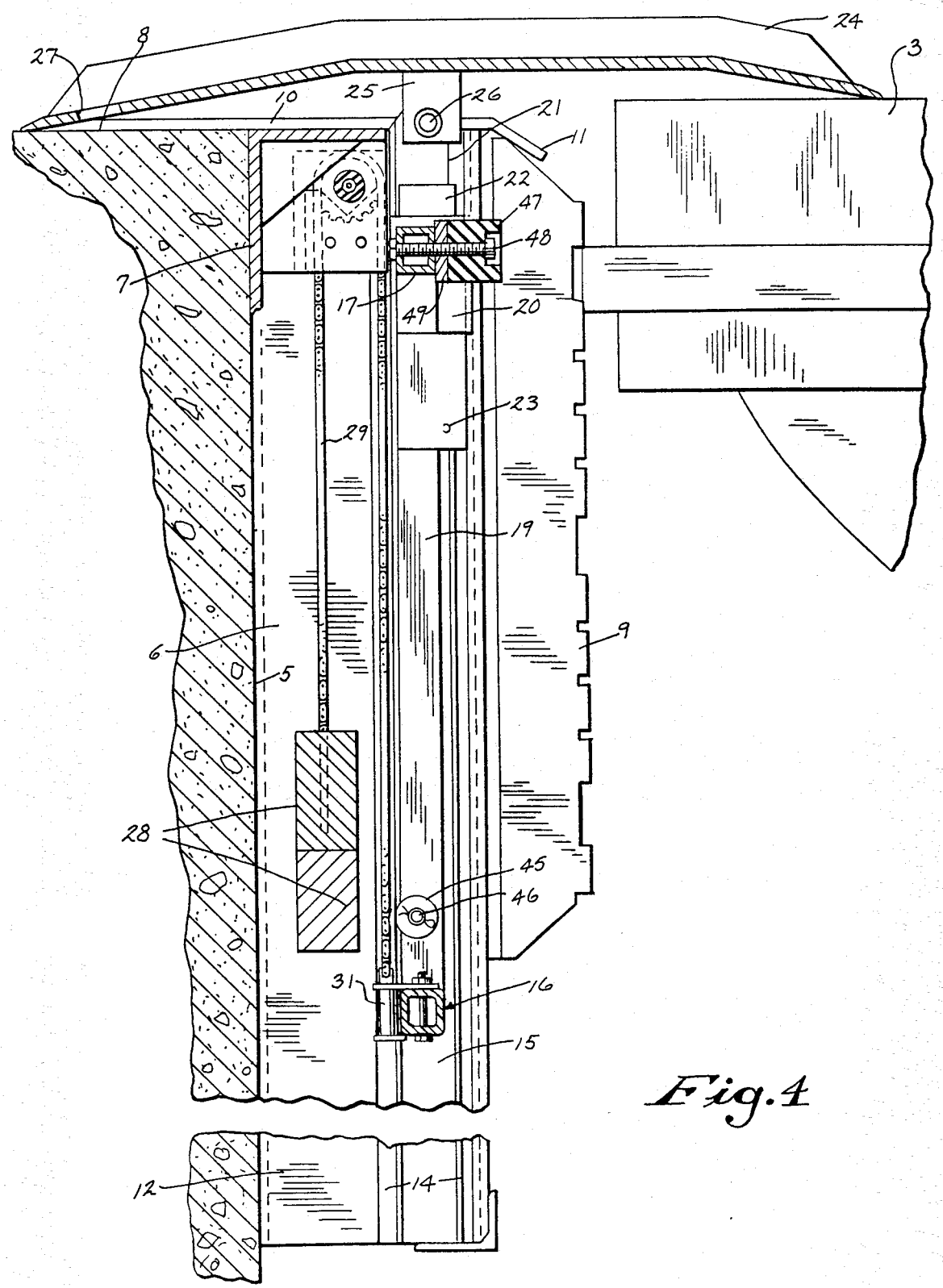
FIG. 4 is a view similar to FIG. 2 showing the deckplate in the horizontal cross traffic position where it spans the gap between the loading dock and the truck bed.

The drawings illustrate a dockboard 1 which is secured to the front surface of a loading dock 2, and in use, is adapted to span the gap between the upper surface of the loading dock and the bed 3 of a truck or carrier located in front of the dock.

The dockboard 1 includes a supporting structure 4 which is mounted on the front wall 5 of the dock 2. The supporting structure consists of a pair of generally rectangular vertical beams 6 which are located along the sides of the dockboard and the upper ends of the beams 6 are connected together by a horizontal angle 7. As best shown in FIG. 2, the horizontal leg of the angle 7 is mounted flush with the upper surface 8 of the dock, while the vertical leg of the angle 7 is mounted to the vertical front face 5 of the dock.

Bumpers 9 are mounted on the forward faces of the vertical beams 6 and upper plates 10 are bolted to the upper surface 8 of the dock and extend forwardly over the upper ends of the respective beams 6. Plates 10 are provided with downwardly bent edge portions 11 which overhang the upper portion of the respective bumper 9 and prevent the truck bumper from overriding and hanging up on the bumpers 9.

The supporting structure 4 also includes a pair of supports 12 which extend downwardly from the beams 6, and a front plate 13 is secured between the supports 12.

A pair of spaced vertical guide members 14 are secured to the inner surface of each beam 6 and the corresponding supports 12 and each pair of guide members 14 defines a vertical guideway 15.

Figure 8:
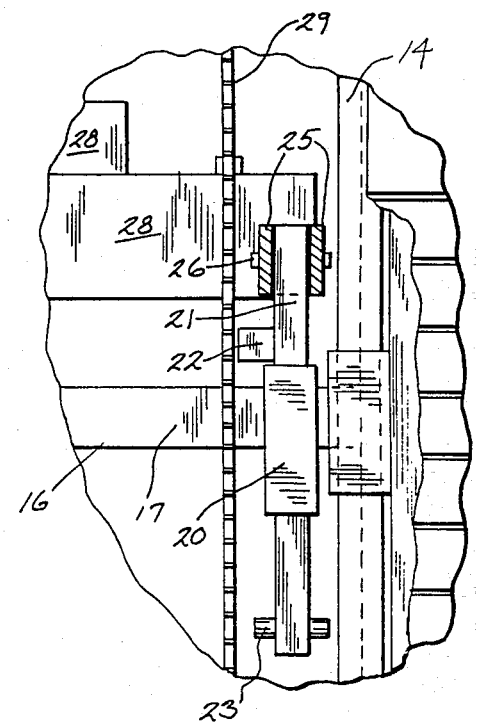
FIG. 8 is a fragmentary enlarged front elevation showing the mounting of the rectangular frame to the guide structure.

A generally rectangular frame 16 is mounted for vertical movement within the guideway 15, and as best illustrated in FIGS. 1 and 8, the frame includes an upper generally rectangular beam 17, a lower horizontal generally rectangular beam 18 and a pair of side bars 19, which connect the ends of the beams 17 and 18. A central box-shaped beam 19a connects the central portions of beams 17 and 18. The side bars 19 are mounted for sliding movement within the guideways 15 to thereby permit the frame 16 to move vertically relative to the loading dock 2.

As best illustrated in FIG. 5, generally box-shaped guide members 20 are mounted on the upper beam 17 adjacent the side edges of the rectangular frame 16, and guide bars 21 are mounted for sliding vertical movement within the guides 20. To limit the downward movement of the guide bars 21 with respect to the guides 20, a stop block 22 is mounted on the upper end of each guide bar and is adapted to engage the upper end of the guide 20 to limit the downward movement of the guide bar 21 relative to the guide 20. Similarly, upward movement of each guide bar 21 within the guide 20 is limited by a pin 23 which extends through an opening in the lower end of the guide bar.

A generally rectangular deck plate or ramp 24 is pivotally connected to the upper ends of the guide bars 21. To provide the pivotal connection, each side edge of the deck plate is provided with a pair of lugs 25 which are connected to the upper end of the respective guide bars 21 by pins 26. This pivotal connection permits the deck plate 24 to be pivoted relative to the rectangular frame 16.

The forward edge of the deck plate is biased downwardly so that the deck plate will normally assume a generally vertical storage position, as shown in FIG. 2. The deck plate can be most conveniently biased to this position by locating the pivotal connection between the lugs 25 and the pins 26 at a position to the rear of the fore-to-aft center of gravity of the deck plate. Thus, when unrestrained, the deck plate falls by gravity to the generally vertical storage position, as shown in FIG. 2. Alternately, springs or other biasing means can be used to urge the deckplate to the vertical position.

To aid in manually lifting the deckplate from the vertical storage position shown in FIG. 2 to the raised or elevated position shown in FIG. 3, a hand hole 27 is formed in the rear edge of the deck plate.

A counterbalancing system is incorporated to partially counterbalance the weight of the deck plate 24 and frame 16, in order to reduce the manual force necessary to raise the deck plate. In this regard, a series of counterbalancing weights 28 are located adjacent the front wall of the dock, and chains 29 are connected to the ends of the weights 28 and pass upwardly over sprockets 30 and are dead-ended on lugs 31 located adjacent the ends of the lower beam 18 of the rectangular frame 16. With this construction the weights 28 will serve to partially counterbalance the weight of the frame 16 and deck plate 24 to enable the deck plate to be lifted with a lesser force.

Figure 6:
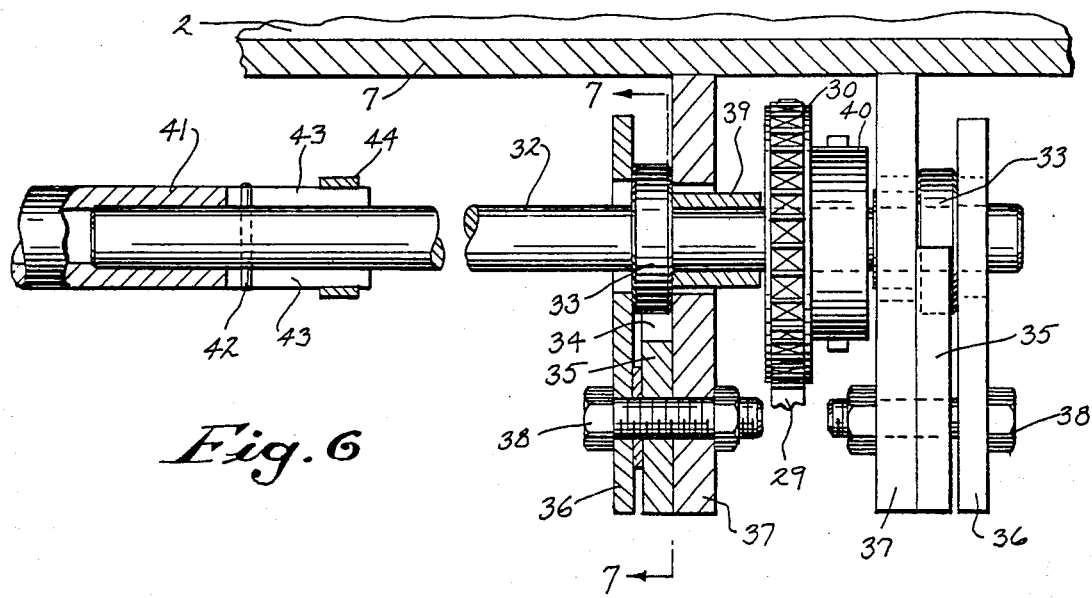
FIG. 6 is an enlarged horizonal section showing the shaft mounting for the counterbalancing mechanism.
Figure 7:
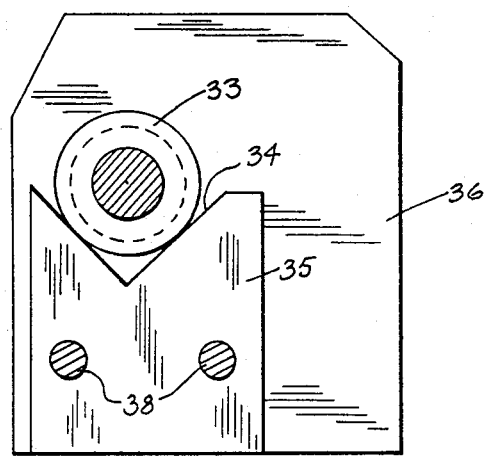
FIG. 7 is a view taken along line 7—7 of FIG. 6.

The chains 29 which connect the counterweights and the deck plate are synchronized so that they operate in unison to thereby prevent the rectangular frame from jamming within the guideways 15, as it is raised and lowered. As best illustrated in FIG. 6, each sprocket 30 is mounted on a horizontal shaft 32 and each shaft 32 is journalled for rotation within a pair of bearings 33. Each bearing 33 is mounted within a V-shaped recess 34 in a bearing plate 35 and the bearing plates 35 are sandwiched between plates 36 and 37 which extend forwardly from the horizontal leg of the angle 7. The plates 35, 36 and 37 are connected together by bolts 38. In addition, spacer sleeves 39 and 40 are mounted on the shaft and maintain the sprockets 30 in proper position on the shafts 32.

To drive the chains 29 in synchronization, the inner ends of the shafts 32 are connected within the respective ends of a tube 41 by pins 42. With this construction, the shafts 32 will rotate in synchronization as the counterweights move vertically relative to the dock. The pins 42 extend through aligned slots 43 formed in the respective ends of the tube 41, and collars 44 are secured around the ends of the tube to prevent expansion of the slots. The slots permit limited longitudinal movement of the shafts 32 and compensates for possible misalignment in the installation of the dockboard and also enables the sprockets 30 to float axially during normal operation of the dockboard.

To aid in moving the frame 16 vertically in the guideways 15, rollers 45 are mounted on roller shafts 46 attached to the lower portions of the side bars 19 and the rollers are adapted to ride against the front surfaces of the respective rear guides 14. As the center of gravity of the deck plate is located forwardly of the plane of the frame 16, the gravity moment will tend to pivot the frame forwardly about the lower ends of bars 19, and the rollers 45 thereby function to provide a smooth non-jamming movement of the frame 16 within the guideways 15.

The ramp or deck plate 27 is stored in the vertical position, as shown in FIG. 2, with the rear or upper edge of the deck plate located slightly below the upper surface of the dock. The truck 3 or other carrier, backs toward the dock until the bed of the truck engages the bumpers 9. To place the deck plate in operating position, the operator pulls upwardly on the deck plate through use of the hand hole 27, moving the deck plate to an upper vertical position, as shown in FIG. 3. In this position, the lower edge of the deck plate is located above the bed of the truck, so that the deck plate can then be pivoted to a generally horizontal position. After pivoting the deck plate to the horizontal position, the deck plate falls by gravity, with the side members 19 of the rectangular frame 16 sliding downwardly within the guideways 15, until the rear edge of the deck plate engages the upper surface of the dock and the forward edge of the deck plate engages the bed of the carrier.

As previously mentioned, the bed of the carrier, in many instances, will not be parallel to the upper surface of the dock, but will be slanted or tilted relative thereto. Thus, when the deckplate moves by gravity to the cross traffic position, only a portion of the forward edge of the deck plate may be engaged with the bed 3 of the carrier.

During the loading operation, a lift truck may move across the deck plate causing a forward-to-rear impact. When the weight of the lift truck moves over the forward edge of the deck plate, which is on the bed of the carrier, the sliding connection between the guide bars 21 and the guides 20 will permit the deck plate to tilt in a diagonal direction to bring the entire forward edge of the deck plate into engagement with the bed of the carrier, as the lift truck passes thereover. This pivotal action substantially reduces the stress on the deck plate which would occur if a portion of the deck plate is out of contact with the bed as the lift truck moves thereover.

The sliding connection between the frame 16 and the dock permits the deck plate 27 to accommodate substantial variances in height between the upper surface of the dock and the bed 3 of the carrier. For example, if the truck is unloading, the bed of the carrier may raise substantially as the load is removed from the truck bed, while in the other cases, the bed of the truck may lower due to a lift truck moving across the bed or as additional load is applied to the bed. In either case, the sliding connection will enable the plate or ramp to follow these variations in relative height between the bed and the dock.

When the loading operation has been completed, the truck pulls away from the dock and due to the fact that the deck plate 24 is nose heavy, the forward edge of the deck plate will pivot downwardly. To cushion the impact, a pair of resilient bumpers 47 are mounted through bolts 48 and spacers 49 to the upper beam 17 of frame 16. As the weight of the deck plate is greater than the counterbalancing force of weights 28, the deckplate and the frame will move downwardly by gravity until the lower ends of the guide bars 19 bottom out in the guideways 15.

As the deck plate moves downwardly to its storage position the counterweights 28 will correspondingly move upwardly and when the guide bars 19 bottom out in the guideways, inertia will cause the counterweights to continue to rise and then drop, resulting in a bouncing action which subjects the chains to substantial stress. In addition, movement of a load, such as a fork lift truck, over the deckplate when in its cross traffic position, will also cause the deckplate and counterweight to bounce due to the impact, and this again will subject the chain to substantial stress. In order to cushion these shock loads, a resilient cushioning mechanism is incorporated with the connections of the chains 29 to the counterweights 28 and to the frame 16.

As best illustrated in FIG. 11, one end of each chain 29 is connected to the upper flatened end 47 of a stud 48 which is located within a hole 49 in the projecting end of the lower counterweight 28.

The head 50 of stud 48 is located within a recess 51 formed in the counterweight, and the head bears against a Bellville spring 52 and washer 53. The Bellville spring 52 is a conventional type, being annular in shape, and in an unloaded condition is upwardly concave, as shown in FIG. 11.

A similar connection is provided between the opposite end of each chain 29 and the frame 16 as illustrated in FIGS. 9 and 10. A stud 54 extends through a generally L-shaped bracket 55 which is attached to the side of the frame member 18. The lower end of the chain 29 is attached to the flattened upper end 56 of the stud, while the head 57 of the stud bears against a Bellville spring 58 and washer 59.

The Bellville springs 52 and 58 provide a high spring force in a relatively small space, and the springs serve to cushion the shock loads in the chains and prevent premature failure of the chains.

FIGS. 12-14 show a modified form of the invention, in which the pivotal connection between the deckplate and the frame is moved toward the rear edge of the deckplate to provide an increased forward overhang for the deckplate when in the cross traffic position. As shown in FIG. 12, the connecting lugs 25 which are attached to the underside of the deck plate 24 are located further to the rear of the deck plate. As in the case of the first embodiment, the lugs 25 are pivotally connected by pivots 26 to the upper ends of the slide bars 21 that are movable within the guides 20 attached to the rectangular frame 16.

Due to the location of the pivotal connection, the counterbalancing mechanism aids in manually pivoting the deckplate from the vertical storage position to the horizontal cross traffic position. As illustrated in FIGS. 12-14, the counterbalancing mechanism comprises a gas spring assembly, indicated generally by 60, that includes a cylinder 61, and the upper end of the cylinder carries a clevis 62 which is pivotally connected to a lug 63 mounted on the underside of the deck plate 24.

A piston rod 64 extends from the lower end of the cylinder 61 and carries a clevis 65 that is connected through bolt 66 to one end of a J-bracket 67. The opposite end of the J-bracket 67 is connected by bolts 68 to one of the slide bars 21. As in the first embodiment, slide bars 21 are mounted for sliding movement within the guides 20 attached to the rectangular frame 16.

The bolt 66 which connects the clevis 65 to the J-bracket 67 extends through a slot 69 in the J-bracket, and the slot provides an amount of over-ride to prevent damage to the gas spring in the event the gas spring is in a fully extended position and the deck plate is pivoted further upwardly in a direction to further extend the gas spring.

A stop 70 is secured to the upper end of the slide bar 21 and is adapted to be engaged by the end of the lug 25 to limit the rearward pivoting movement of the deck plate about the slide bars 21.

The construction of the rectangular frame 16 and the counterweight mechanism of the embodiment shown in FIGS. 12-14, is the same as that previous described with respect to the embodiments of FIGS. 1-11.

With the pivot 26 between the deck plate 24 and the slide bar 21 being located to the rear of the front-to-rear center line of the deck plate, a greater manual force is required to pivot the deck plate to the horizontal position. The gas spring assembly 60 partially counterbalances the weight of the deck plate 24 to reduce the manual force necessary to pivot the deck plate from the vertical to the horizontal position. The gas spring assembly 60 also aids in cushioning the downward pivotal movement of the deck plate when the truck moves away from the dock to prevent the deck plate from slamming downwardly against the bumpers 47.

Various modes of carrying out the invention are contemplated as being within the scope of the following claims particularly pointing out and distinctly claiming the subject matter which is regarded as the invention.

I claim:

1. A dockboard to be mounted on a loading dock having an upper surface and a front wall, comprising a generally rectangular frame disposed adjacent the front wall of the dock, guide means for mounting the frame for vertical movement relative to the dock, a pair of elongated tubular guideways disposed on said frame adjacent the sides thereof, a guide bar mounted for sliding vertical movement within each guideway, and a deck plate pivotally connected to the upper ends of the guide bars, said deck plate being liftable vertically from a first vertical lower storage position in which the deck plate is disposed generally vertically along the front wall of the dock to a second higher vertical position where at the lower end of the deck plate is above a bed of a carrier disposed adjacent the front wall of the dock so that the deck plate can be pivoted about said guide bars to a generally horizontal position and lowered to a cross traffic position to span the distance between the dock and the bed of said carrier with the rear end of the deck plate supported on the dock and thr forward end of the deck plate supported on the carrier, the forward end of the deck plate being biased downwardly so that the deck plate will assume a generally vertical position when the carrier is removed from its location adjacent the front wall of the dock and said deck plate will descend by gravity to said storage position, the sliding connection of the guide bars to said frame permitting the deck plate to tilt as a load passs over the deck plate when in the cross traffic position.

2. The dockboard of claim 1, and including counterbalancing means connected to the frame for partially counterbalancing the weight of the deckplate.

3. The dockboard of claim 2, wherein said counterbalancing means comprises a weight, and a pair of chains interconnecting the weight and the side edges of said frame.

4. The dockboard of claim 3, and including a pair of rotatable sprockets mounted in spaced relation adjacent the upper edge of the dock, each sprocket being engaged with a chain, one end of each chain connected to said weight and the opposite end of each chain connected to the lower portion of said frame.

5. The dockboard of claim 4, and including a shaft to carry each sprocket, and means for interconnecting the shafts to provide synchronous movement of said chains as the weights move vertically.

6. The dockboard of claim 1, wherein said guide means is composed of a pair of vertical walls spaced in a front-to-rear direction, said dockboard including a guide roller mounted on each side of the frame and disposed to ride against the forward surface of the rear vertical wall of each pair.

7. A dockboard to be mounted on a loading dock, said dock having an upper surface and a front wall, comprising a supporting structure mounted on the front wall of the dock, a generally rectangular frame disposed adjacent the front wall of the dock, guide means for mounting the frame for vertical movement on said supporting strucure, an elongated guideway disposed adjacent each side edge of the frame, a guide bar mounted for free vertical movement in each guideway, a deck plate having a front edge and a rear edge and a pair of side edges, means for pivotally connecting the side edge portions of the deck plate to the respective guide bars, counterweight means disposed along the front wall of the dock, a pair of chains, a pair of sprockets mounted at the upper end of the supporting structure and engaged with the respective chains, one end of each chain being connected to said counterweight means and the opposite end of each chain belong connected to the lower portion of said frame, a shaft to carry each sproket, said shafts being in general axial alignment, a connecting member connecting the adjacent ends of the shafts together whereby the chains will operate in synchronization as the counterweight means moves vertically to prevent skewing of said frame in said guide means, and means for permitting limited relative axial movement between each shaft and the connecting member.

8. A dockboard to be mounted on a loading dock having an upper surface and a front wall, comprising a generally rectangular frame disposed adjacent the front wall of the dock, guide means for mounting the frame for vertical movement relative to the dock, a pair of elongated tubular guideways disposed on said frame adjacent the sides thereof, a guide bar mounted for free sliding vertical movement within each guideway, and a deck plate pivotally connected to the upper ends of the guide bars, said deck plate being liftable vertically from a first vertical lower storage position in which the deck plate is disposed generally vertically along the front wall of the dock to a second higher vertical position where at the lower end of the deck plate is above the bed of a carrier disposed adjacent the front wall of the dock so that the deck plate can be pivoted about said guide bars to a generally horizontal position and lowered to a cross traffic position to span the distance between the dock and the bed of said carrier with the rear end of the deck plate supported on the dock and the forward end of the deck plate supported on the carrier, the forward end of the deck polate being biased downwardly so that the deck plate will assume a generally vertical position when the carrier is removed from its location adjacent the front wall of the dock and said deck plate will descent by gravity to said storage position, the sliding connection of the guide bars permitting the deck plate to tilt as a load passes over the deck plate when in the cross traffic position, and counterbalancing means interconnecting one of said guide bars and the deck plate for partially counterbalancing the weight of the deck plate to enable the deck plate to be pivoted to said generally horizontal position with a lesser manual force.

9. The dockboard of claim 8, wherein said counterbalancing means comprises a gas spring, said gas spring including a cylinder connected to one of said deckplate and said guide member, and a piston member slidable within the cylinder and connected to the other of said deckplate and said guide member.

10. The dockboard of claim 9, wherein the gas spring is connected between the lower end of said guide member and the underside of the deck plate, being located forwardly from the pivotal connection of said deck plate to the upper ends of said guide members.

11. The dockboard of claim 10, including a connecting member interconnecting the lower end of said guide member and said gas spring, said connecting member having an extensible connection disposed to permit said gas spring when fully extended to move relative to said guide member and prevent over extension of said gas spring on continued pivotal movement of said deckplate.

12. The dockboard of claim 11, wherein said extensible connection comprises a slotted connection between said gas spring and said connecting member.

* * * * *

UNITED STATES PATENT AND TRADEMARK OFFICE
CERTIFICATE OF CORRECTION

PATENT NO. : 4,501,042

DATED : February 26, 1985

INVENTOR(S) : Mark A. Difonzo

It is certified that error appears in the above-identified patent and that said Letters Patent is hereby corrected as shown below:

```
Column 7, line 63, "thr" should read -- the --;
Column 8, line 3, "passs" should read -- passes --;
Column 8, line 46 "sproket" should read -- sprocket --;
Column 9, line 11 "descent" should read -- descend --;
Column 10, line 7 after "plate" insert -- the pivotal
connection of said gas spring to said deck plate --.
```

Signed and Sealed this

Twenty-sixth Day of November 1985

[SEAL]

Attest:

DONALD J. QUIGG

Attesting Officer

Commissioner of Patents and Trademarks